Feb. 24, 1948. A. D. DUNCKLEE 2,436,504
LOG SAWING ATTACHMENT FOR TRACTORS
Filed March 23, 1944 4 Sheets-Sheet 1
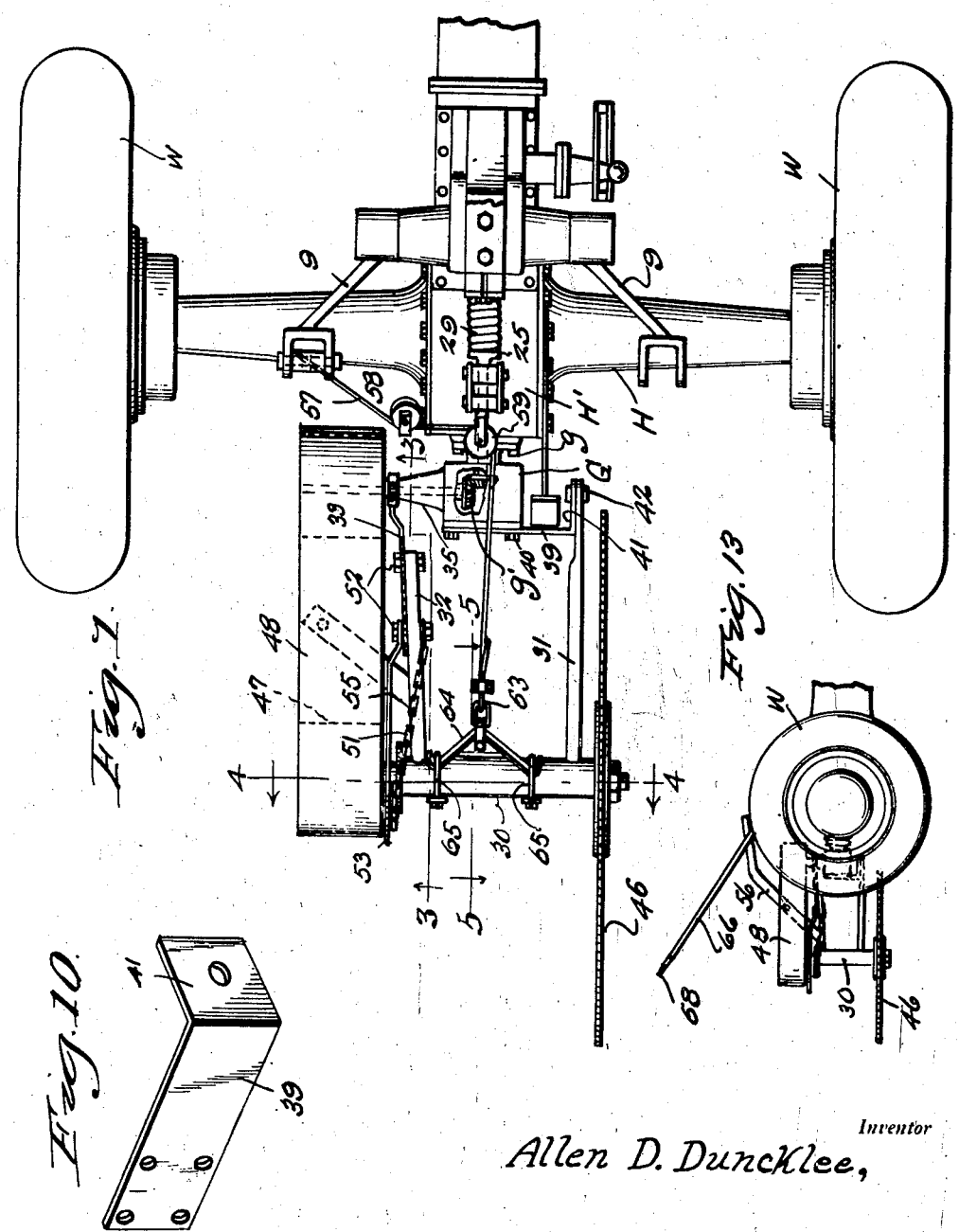
Inventor
Allen D. Duncklee,
By Clarence A. O'Brien
and Harvey B. Jacobson
Attorneys

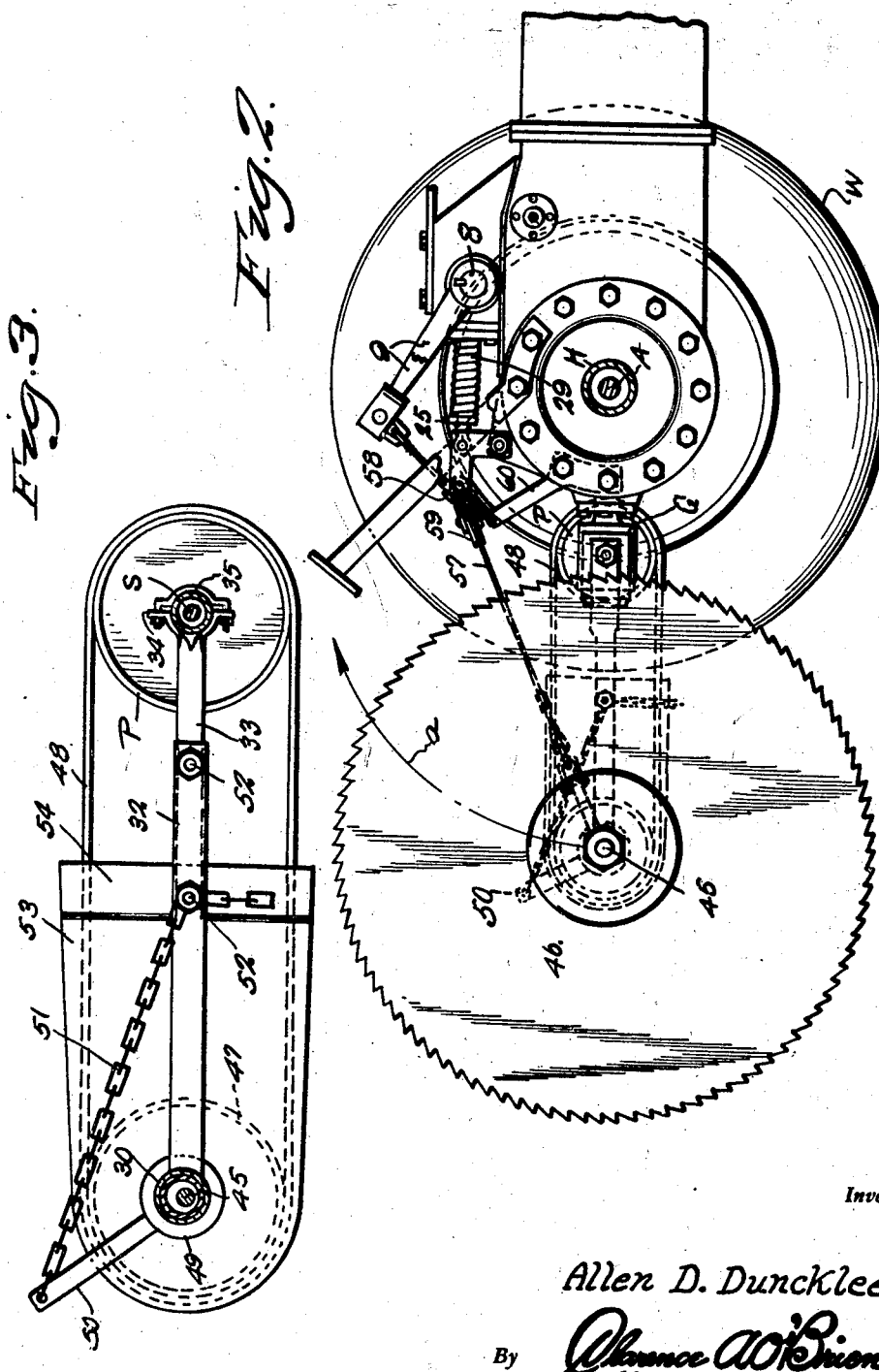

Feb. 24, 1948. A. D. DUNCKLEE 2,436,504
LOG SAWING ATTACHMENT FOR TRACTORS
Filed March 23, 1944 4 Sheets-Sheet 3
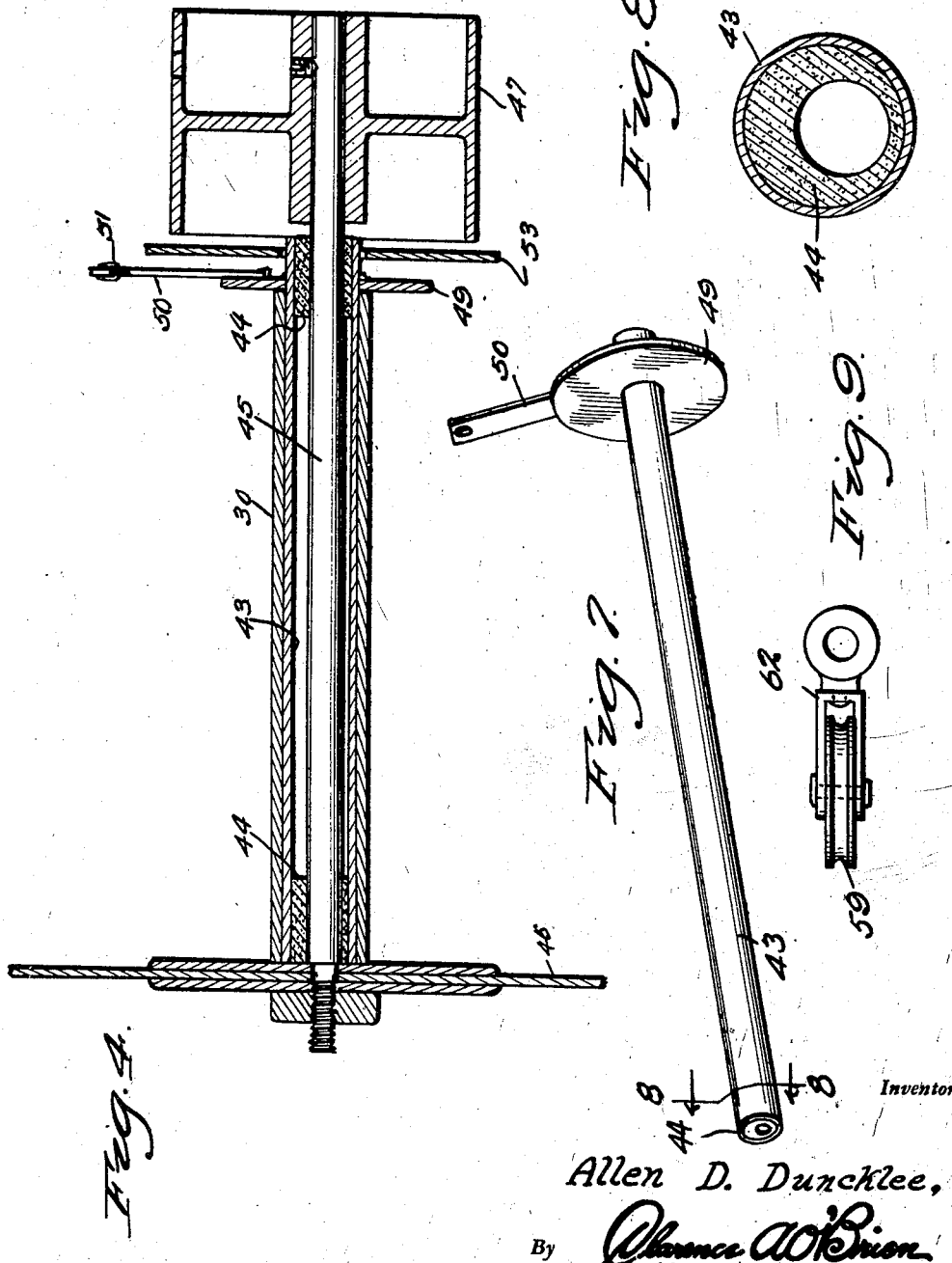
Inventor
Allen D. Dunklee,
By
Attorneys

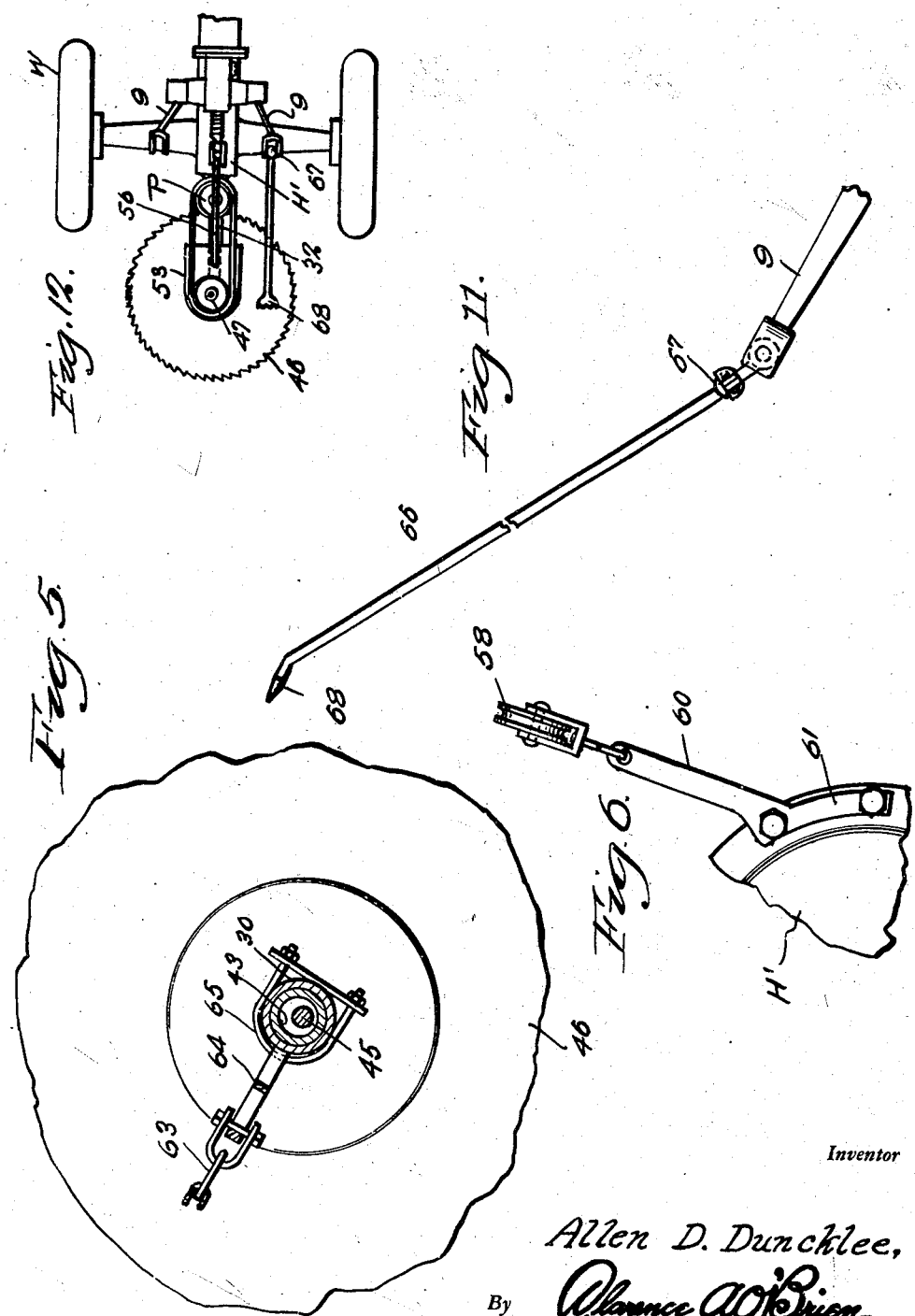
Feb. 24, 1948.  A. D. DUNCKLEE  2,436,504
LOG SAWING ATTACHMENT FOR TRACTORS
Filed March 23, 1944  4 Sheets-Sheet 4
Inventor
Allen D. Duncklee,
By Clarence A. O'Brien
and Harvey B. Jacobson
Attorneys Patented Feb. 24, 1948

2,436,504

UNITED STATES PATENT OFFICE 2,436,504

LOG SAWING ATTACHMENT FOR TRACTORS

Allen D. Duncklee, Bowesmont, N. Dak.

Application March 23, 1944, Serial No. 527,819

1 Claim. (Cl. 143—43)

This invention relates to a sawing attachment for a conventional agricultural tractor, the attachment being operated from the power take-off of the tractor to enable the latter to be employed as a mobile sawing machine for felling trees or for sawing the felled trees into logs or sections of suitable length.

The primary object of the present invention is to provide a simple, practical and relatively inexpensive attachment of the above kind which can be readily applied to a certain standard make of tractor.

A more specific object of the present invention is to provide an attachment of the above kind which may be applied to the tractor in one position for use in felling trees, or which may be applied to the tractor in another position for sawing the felled trees into logs or sections of suitable lengths, suitable means being provided to feed the saw to the work when the attachment is employed in either position.

The present invention includes further objects and features that will become apparent as the nature of the invention is better understood, and the invention consists in the novel form, combination and arrangement of parts hereinafter more fully described, shown in the accompanying drawings and claimed.

In the drawings, wherein like reference characters indicate corresponding parts throughout the several views;

Figure 1 is a fragmentary top plan view showing the rear portion of a tractor equipped with a sawing attachment constructed in accordance with the present invention, the attachment being positioned with the saw vertical, as in sawing felled trees into logs of suitable length.

Figure 2 is a side elevational view thereof, partly broken away and in section.

Figure 3 is an enlarged fragmentary longitudinal section taken on line 3—3 of Figure 1.

Figure 4 is an enlarged transverse section taken on line 4—4 of Figure 1.

Figure 5 is a fragmentary longitudinal section taken on line 5—5 of Figure 1.

Figure 6 is a fragmentary elevational view showing the manner of mounting one of the guide pulleys for the flexible member forming part of the means for controlling the feeding movement of the saw when the attachment is used in the position of Figure 1.

Figure 7 is an enlarged perspective view of a unit forming part of the means for adjusting the saw-carrying shaft of the attachment so as to tighten the driving belt for the saw.

Figure 8 is an enlarged transverse section taken on line 8—8 of Figure 7.

Figure 9 is an edge elevational view of another guide pulley for the cable which controls feeding movement of the saw, when the attachment is applied as in Figure 1.

Figure 10 is an enlarged perspective view of one of the members of the frame of the sawing attachment.

Figure 11 is a fragmentary side elevational view, partly broken away, showing a tree-engaging bar attached to a power-operated lift arm of the tractor and adapted for use in preventing a tree from falling on the tractor when the attachment is employed for felling trees.

Figures 12 and 13 are respectively somewhat diagrammatic top plan and side elevational views, drawn on a reduced scale and respectively somewhat similar to Figures 1 and 2, but showing the present sawing attachment applied to the tractor in the position wherein the saw may be employed for felling trees.

Referring in detail to the drawings, the present invention relates to a sawing attachment for a well known standard make of tractor equipped with a power-operated implement raising and lowering apparatus of the type shown in the U. S. patents to H. G. Ferguson, Nos. 2,118,180 and 2,223,002, respectively issued May 24, 1933, and November 26, 1940, and also equipped with a longitudinal power take-off shaft such as indicated at 36 in the second-mentioned patent. As shown in Figures 1 and 2, the tractor has rear driving and supporting wheels W mounted on rear axles A journaled in a housing H and operatively connected by a conventional differential gearing within the enlarged central portion H' of said housing. The reference character G indicates a conventional gearing unit that is supplied for this type of tractor and whose casing is adapted to be bolted, as at $g$ to the rear lower portion of housing portion H', said unit G including a drive shaft arranged for driving engagement with the power take-off shaft of the tractor and operatively connected by gearing, as at $g'$, with a lateral driven shaft S having a projecting end equipped with a power take-off pulley P (see Fig. 3). This unit G is ordinarily used so that a power transmission belt may be extended rearwardly from the tractor for driving any desired kind of machinery, said belt being passed around the pulley P and around a pulley of the machine being driven. As is well known in the art, the unit G may be positioned as shown in Figure 1 with the driven shaft S extending laterally and horizontally, or as shown in Figure 12, with said shaft extending vertically or upwardly, depending upon the position in which the casing of unit G is bolted to the housing portion H'. As set forth in the above-mentioned Patent No. 2,118,180, and also clearly shown in Figure 2 of the above-mentioned Patent No. 2,223,002, the power-operated implement raising and lowering apparatus includes a rock shaft 8 having upwardly and rearwardly extending lift arms 9 fixed thereon. These are ordinarily connected by lift rods to lower links connecting the frame of the implement with the tractor, which lift rods and links are not employed when the present sawing attachment is installed to take the place of the agricultural implement. This lift or implement raising and lowering apparatus also includes a draft-sensitive element 25 associated with a spring 29 and usually connected to upper links which are used to connect the frame of the agricultural implement to the tractor. In using the present sawing attachment, the upper links are dispensed with, and a guide pulley is attached to the element 25 as hereinafter described.

The present sawing attachment includes a frame composed of a rear transverse member 30 in the form of a cylindrical tube, and side frame members 31 and 32 rigid with and projecting forwardly from the member 30 near the ends thereof, the member 32 including a forward longitudinally adjustable section 33 provided at its forward end with means 34 for pivotally mounting the frame member 32 on the lateral housing 35, for shaft S, which is carried by the casing of unit G. An angular mounting bracket 39 is provided for the other side frame member 31 of the attachment, said bracket including an arm bolted at 40 to the casing of unit G and a forwardly projecting arm 41 to which the forward end of frame member 31 is pivoted or hinged, as at 42. The pivotal mounting of frame member 32 on housing 35 is in transverse alignment with the pivot 42 of frame member 31, and in this way the frame of the attachment is mounted for vertical swinging movement about a transverse horizontal axis. The adjustability of frame member 32 permits accurate adjustment of the saw-carrying shaft so that it will be parallel with the driven shaft S when the attachment is applied to the tractor.

A bearing unit is provided including a sleeve 43 (Fig. 4) rotatably fitted in the tubular frame member 30 and having eccentric bearings 44 (Figs. 7 and 8) fitted in the ends thereof and within which is journaled a transverse shaft 45 whose ends project at opposite ends of the frame member 30. A circular saw 46 is secured on one projecting end of shaft 45, while a pulley 47 is secured on the other projecting end thereof, the pulley 47 being aligned with and located rearwardly of pulley P. An endless driving belt 48 passes around the pulleys P and 47 so that power is transmitted from the power take-off shaft of the tractor to the saw-carrying shaft 45. Fixed on the end of sleeve 43 adjacent pulley 47 is a disc 49 having an upwardly and rearwardly projecting lever 50 fixed thereto. As will be seen from several of the figures, particularly Figure 3, a forward pull upon lever 50 will rotate sleeve 43 so that eccentric bearings 44 will act to shift the saw-carrying shaft 45 rearwardly, to thereby tighten the belt 48. When such adjustment is effected, it may be secured or maintained by providing means to prevent rearward swinging movement of lever 50 from its adjusted position.

Such a means may consist of a chain 51 attached at one end to the outer end of lever 50 and secured to frame member 32 by one of the bolts 52 which adjustably secure the sections of frame member 32 in relatively adjusted position. The chain 51 extends forwardly from the lever 50 to the bolt 52 and will effectively hold the lever against rearward swinging movement after the shaft 45 has been adjusted to tighten belt 48. A suitable guard plate 53 may be mounted at the inner side of pulley 47 and of the rear portion of belt 48 so that the latter will be prevented from shifting laterally toward the parts of the attachment disposed inwardly thereof. As shown, the forward end portion of guard plate 53 is offset inwardly, as at 54, and may be secured to the frame member 32 by one of the bolts 52. A socket member 55 is fixed to frame member 32 and projects outwardly and forwardly therefrom between the flights of belt 48. This socket is adapted for removable reception of an angular handle 56 by means of which the sawing attachment may be swung laterally to feed the saw through the work or to retract it from the work when the saw is horizontally positioned for felling trees, as illustrated in Figures 12 and 13. However, when the unit G is bolted in place, as shown in Figure 1, to position the saw 46 vertically so that the attachment may be used for sawing felled trees into logs, a different means is provided for feeding and retracting the saw relative to the work. This means includes a flexible member or cable 57 having one end attached to the free end of one of the lift arms 9 and its other end connected with the intermediate portion of frame member 30, said flexible member or cable 57 passing about suitable guide pulleys 58 and 59. Guide pulley 58 is mounted on the upper end of an upwardly projecting arm 60 of a bracket 61 bolted to the side of differential housing H' of the tractor (see Fig. 6). Pulley 59 has a mount 62, as shown in Figure 9, which is suitably connected to the draft-sensitive element 25 of the tractor. Pulleys 58 and 59 are located at an elevation so that when the lift arm 9 to which cable 57 is attached is swung upwardly and forwardly, a pull is exerted on said cable 57 so as to raise the saw-carrying frame or swing it upwardly, as indicated by the arrow a in Figure 2. On the other hand, when said lift arm 9 is swung rearwardly and downwardly, the saw-carrying frame is permitted to lower by gravity to feed the saw to the work. Should the saw 46 stick relative to the work when lift arm 9 is operated to withdraw the saw from the work, the draft-sensitive element 25 of the tractor will automatically control the valve means of the hydraulic lift apparatus in accordance with the resistance offered to withdrawal of the saw from the work, in the same manner in which said element 25 ordinarily acts to control the valve means in accordance with the draft imposed on the agricultural implement, as disclosed in the patents named above. These patents clearly point out that the valve means controls admission of operating fluid to the pump of a fluid pressure control unit forming part of the apparatus for raising and lowering the agricultural implement. It will thus be seen that I have provided simple and efficient means for utilizing the lift arm 9 for swinging the saw frame upwardly to withdraw the saw from the work when the attachment is employed for sawing felled trees into lengths, and for allowing the saw frame to lower by gravity and thereby permit feeding of the saw to the work.

As shown clearly in Figures 1 and 5, the cable 57 may be connected to a chain 63 which is in turn connected to the central portion of a bail 64 that has its ends secured to the frame member 30 by means of U-bolts 65 embracing said frame member 30.

When the attachment is applied, as shown in Figures 12 and 13, with the saw horizontally positioned for felling trees, it is desirable to provide a bar 66 to prevent the tree from falling on the tractor. As shown in Figure 11, one end of bar 66 may be connected by a universal joint 67 with the free end of a lift arm 9 of the tractor, the other end of bar 66 being sharpened and toothed at 68 to bite into the tree trunk. By properly setting the bar 66 with respect to the arm 9, the tree may be effectively braced against falling forwardly on the tractor.

From the foregoing description, it is believed that the construction and operation, as well as the advantages of the present invention, will be readily understood and appreciated by those skilled in the art. With the device applied to the tractor, as illustrated in Figures 12 and 13, the attachment may be swung laterally toward one side of the tractor by means of the handle 56, and the tractor may be moved into place so that the saw 46 is disposed alongside the trunk of a tree, near the ground. The power take-off shaft of the tractor is then thrown into operation by the usual controlling means provided on the tractor, and power is transmitted from this power take-off shaft to pulley P through the gearing g' in unit G. In this way saw 46 is rotated at a proper speed and the attachment is swung in the direction of the tree by manipulation of handle 56 as the sawing operation proceeds. The saw is thus fed to the work, and before the felling operation is completed, the bar 66 may be used as described so as to brace the tree and prevent it from falling onto the tractor. When the attachment is applied, as shown in Figure 1, the felled tree may be cut into logs of suitable length. In this use, the saw is elevated by swinging the frame of the attachment upwardly through the medium of lift arm 9 and cable 57 connected thereto. The tractor is then moved into position with the saw overlying the felled tree, and the saw is driven in the manner described above. Lift arm 9 is then operated so as to swing the same rearwardly and downwardly and pay out on cable 57, thereby allowing the saw to lower into the work as the sawing operation proceeds. The saw is then elevated again for the next cut or sawing operation, which may be accomplished by properly shifting the tractor with respect to the felled tree.

Minor changes in details of construction illustrated and described may be made, such as fall within the spirit and scope of the invention as claimed.

What I claim as new is:

In combination with a tractor having hydraulic lift apparatus including power-operated vertically movable lift arms and a draft-sensitive element for controlling the operating means for said lift arms, said tractor further including a rearwardly extending power take-off shaft, a sawing attachment comprising a saw-carrying frame pivotally mounted upon the rear of the tractor for vertical swinging movement and including a rotary saw, means operatively connecting said saw with the power take-off shaft of the tractor, and means operatively connecting said saw-carrying frame with one of said lift arms for raising said frame to withdraw the saw from the work, said last-named means including a flexible member attached to the frame at one end and to one of the lift arms at the other end, and guide pulleys around which said flexible member passes, one of said guide pulleys being attached to said draft-sensitive element for controlling the lift apparatus in accordance with the resistance offered to withdrawal of the saw from the work.

ALLEN D. DUNCKLEE.

REFERENCES CITED

The following references are of record in the file of this patent:

UNITED STATES PATENTS

| Number | Name | Date |
| --- | --- | --- |
| 1,535,568 | Bornschein | Apr. 28, 1925 |
| 2,202,425 | Marsilius | May 28, 1940 |
| 1,602,357 | Georgells | Oct. 5, 1926 |
| 1,798,402 | Dibble | Mar. 31, 1931 |
| 2,312,287 | Renner | Feb. 23, 1943 |
| 2,350,880 | Dellinger et al. | June 6, 1944 |
| 2,118,180 | Ferguson | May 24, 1938 |
| 1,318,324 | Keon | Oct. 7, 1919 |
| 2,354,625 | Van Sickle | July 25, 1944 |